United States Patent Office 3,225,048
Patented Dec. 21, 1965

3,225,048
PROCESS FOR THE PREPARATION OF 2,6-DIKETO-8-THIAPURINES
Kurt Menzl, Linz, Austria, assignor to Österreichische Stickstoffwerke Aktiengesellschaft, Linz, Austria
No Drawing. Filed Feb. 4, 1963, Ser. No. 256,133
Claims priority, application Austria, Feb. 9, 1962, A 1,061/62
2 Claims. (Cl. 260—256.5)

This invention relates to a process for the preparation of 2,6-diketo-8-thiapurines.

Several processes for the preparation of 2,6-diketo-8-thiapurines are known. In most of these prior processes the corresponding 4,5-diamino-uracil derivative or one of its salts is reacted with thionyl chloride or thionyl aniline to obtain the 2,6-diketo-8-thiapurine. It has also been proposed to prepare the desired thiapurines by fusing a 4-amino-5-nitroso-uracil derivative with thiourea.

All these prior processes must be carried out under anhydrous conditions which necessitates the careful drying of both the starting materials and the solvent used. This involves considerable expense, particularly in this special case, since both the 4,5-diamino-uracil and the 4-amino-5-nitroso-uracil are prepared in aqueous media so that their drying is very complicated. In addition, the temperatures employed in the process using a 4-amino-5-nitroso-uracil derivative as starting material are relatively high, which contributes to the formation of byproducts and to the discolouration of the reaction mixture.

The present invention provides a process in which the exclusion of water is rendered unnecessary, and which is carried out in aqueous suspension at a relatively low temperature.

In accordance with the present invention there is provided a process for the preparation of a 2,6-diketo-8-thiapurine of the general formula:

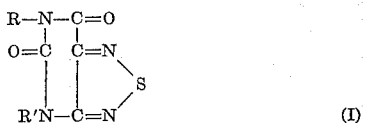

(I)

in which R and R' are each a hydrogen atom or an alkyl, alkenyl or cycloalkyl radical, or an aralkyl or aryl radical, wherein, in the case of R being other than a hydrogen atom, R' is not a hydrogen atom, which comprises reacting a 4-amino-5-nitroso-uracil derivative of the general formula:

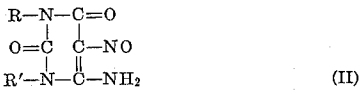

(II)

wherein R and R' have the above meaning, with an alkali metal thiosulphate in an aqueous suspension in the presence of an acid.

During the reaction, the mixture is preferably heated to a temperature within the range of 40° to 90° C.

The acid used in the process of this invention may be of organic or inorganic nature. As examples of organic acids there may be mentioned formic acid and acetic acid, examples of mineral acids being hydrochloric acid and sulphuric acid. Any mineral acid which does not have a strong oxidizing effect may be employed.

According to a particularly preferred embodiment of the invention, the isolation of the 4-amino-5-nitroso-uracil derivative may be dispensed with completely and, instead, there may be employed for the reaction with the thiosulphate the aqueous reaction mixture obtained by the usual nitrosylation of 4-amino-uracil or a derivative thereof of the general formula:

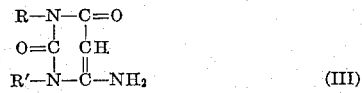

(III)

in which R and R' have the same meaning as in Formula I above, with sodium nitrite in the presence of an acid. In this manner, it is possible to prepare 2,6-diketo-8-thiapurines directly from 4-amino-uracil or its derivatives in a single reaction, thus avoiding one or more reaction steps in contrast to the known processes.

The 2,6-diketo-8-thiapurines of the Formula I are valuable starting materials for organic syntheses and pharmaceuticals. These compounds are further employed in the investigation of nucleic acid metabolism (see U.S. Patent 3,155,680).

The following examples illustrate the invention.

*Example 1*

2.5 mols of 80 to 85% formic acid are run into a suspension of 1 mol of 4-amino-5-nitroso-uracil in an aqueous solution of sodium thiosulphate, at a temperature of about 80° C. and under constant stirring. An almost clear solution is formed, from which, on further heating under reflux, there separates slowly a brownish-yellow precipitate. The mixture is kept at the boil for about four hours and filtered after cooling. Thereafter the filter cake is covered with water and dried in air. After extraction with dichlorethane to remove the sulphur which has separated, the residue is recrystallized from pyridine and dried in vacuo at 120° C. 2,6-diketo-8-thiapurine melting at 291° to 293° C. is obtained with a yield of 66% of the theoretical.

*Example 2*

0.5 mol of amino-uracil is suspended in 500 cc. of water and 0.875 mol of 96% sulphuric acid. A solution of 0.5 mol of sodium nitrite in 100 cc. of water is added dropwise thereto at a temperature below 20° C. slowly and under constant stirring until free nitrous acid can be detected in the reaction mixture. A solution of 0.75 mol of sodium thiosulphate in 250 cc. of water is then added to the reaction mixture. The temperature of the mixture rises spontaneously to 30° to 35° C. The mixture is left to react by itself at first and is then heated to 50° C. for an hour. Lastly, the mixture is cooled to room temperature and the crystallizate is filtered out. After drying, the raw product is recrystallized from pyridine and dried in vacuo at 120° C. 2,6-diketo-8-thiapurine melting at 290° to 293° C. is obtained with a yield of 74.1% of the theoretical.

*Example 3*

0.5 mol of 1,3-dimethyl-4-amino-5-nitroso-uracil is suspended in a solution of 0.83 mol of sodium thiosulphate in 800 cc. of water. At a temperature of 60° to 80° C., 1.5 mols of concentrated sulphuric acid are run in. The mixture is slowly heated to boiling point and left to boil for two hours under reflux. The crude thiapurine is filtered off after cooling and recrystallized from 500 cc. of 30% acetic acid. 1,3-dimethyl-2,6-diketo-8-thiapurine melting at 150° C. to 152° C. is obtained with a yield of 71% of the theoretical.

There may be obtained in a similar manner: from 3-methyl - 4 - amino - 5 - nitroso uracil, 3 - methyl - 2,6-diketo - 8 - thiapurine melting at 215° C. to 216° C.; from 3 - ethyl - 4 - amino - 5 - nitroso - uracil, 3 - ethyl-2,6 - diketo - 8 - thiapurine melting at 184° to 185° C.; from 3 - propyl - 4 - amino - 5 - nitroso - uracil, 3 - propyl-2,6 - diketo - 8 - thiapurine melting at 152° to 152.5° C.

I claim:
1. A process for the preparation of a 2,6-diketo-8-thiapurine of the formula

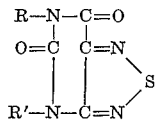

wherein R and R' are selected from the group consisting of hydrogen and alkyl, R' being alkyl when R is alkyl, which comprises reacting in aqueous suspension a 4-amino-5-nitroso-uracil compound of the formula

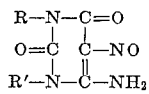

wherein R and R' have the same meaning as above with an alkali metal thiosulfate in the presence of an acid selected from the group consisting of formic acid, acetic acid, hydrochloric acid and sulfuric acid at a temperature between 40° C. and the boiling point of the reaction mixture.

2. A process for the preparation of a 2,6-diketo-8-thiapurine of the formula

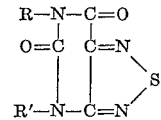

wherein R and R' are selected from the group consisting of hydrogen and alkyl, R' being alkyl when R is alkyl, which comprises reacting in an aqueous medium a 4-amino-uracil compound of the formula

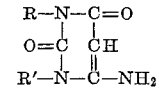

wherein R and R' have the same meaning as above with sodium nitrile in the presence of an acid selected from the group consisting of formic acid, acetic acid, sulfuric acid and hydrochloric acid to form the corresponding 4-amino-5-nitroso compound and reacting the resulting aqueous acid reaction mixture with an alkali metal thiosulfate at a temperature between 40° C. and the boiling point of the reaction mixture.

References Cited by the Examiner

UNITED STATES PATENTS 3,155,680  11/1964  Menzyl _____ 260—256

NICHOLAS S. RIZZO, *Primary Examiner.*